(12) United States Patent
Leeman et al.

(10) Patent No.: US 12,423,866 B2
(45) Date of Patent: Sep. 23, 2025

(54) MAINTAINING INTRINSIC CALIBRATION OF CAMERAS WITH IN-BODY IMAGE STABILIZATION SYSTEMS

(71) Applicant: Motional AD LLC, Boston, MA (US)

(72) Inventors: Peter Leeman, Pittsburgh, PA (US); Nijumudheen Muhassin, Jefferson Hills, PA (US); Jayesh Dwivedi, Oakmont, PA (US)

(73) Assignee: Motional AD LLC, Boston, MA (US)

( * ) Notice: Subject to any disclaimer, the term of this patent is extended or adjusted under 35 U.S.C. 154(b) by 404 days.

(21) Appl. No.: 17/893,732

(22) Filed: Aug. 23, 2022

(65) Prior Publication Data

US 2024/0070915 A1    Feb. 29, 2024

(51) Int. Cl.
    *G06K 9/00*    (2022.01)
    *G06T 7/80*    (2017.01)
    *H04N 23/68*   (2023.01)

(52) U.S. Cl.
    CPC .......... *G06T 7/80* (2017.01); *H04N 23/6842* (2023.01)

(58) Field of Classification Search
    CPC .............................. G06T 7/80; H04N 23/6842
    See application file for complete search history.

(56) References Cited

U.S. PATENT DOCUMENTS

| | | | | |
|---|---|---|---|---|
| 10,157,452 | B1* | 12/2018 | Tighe | G06T 5/80 |
| 10,298,910 | B1* | 5/2019 | Kroeger | G06T 7/85 |
| 10,436,885 | B2* | 10/2019 | Wheeler | H04N 5/04 |
| 10,621,753 | B2* | 4/2020 | Natroshvili | G06T 7/80 |
| 11,067,693 | B2* | 7/2021 | Walls | G06V 20/56 |
| 11,295,471 | B1* | 4/2022 | Bhuta | H04N 7/183 |
| 11,295,477 | B1* | 4/2022 | Wang | G06T 7/80 |

(Continued)

FOREIGN PATENT DOCUMENTS

| | | | | |
|---|---|---|---|---|
| CA | 2767273 A1 * | 11/2012 | | G06T 7/33 |
| CN | 107800959 A * | 3/2018 | | H04N 13/239 |

(Continued)

OTHER PUBLICATIONS

Camera Geometric Calibration Using Dynamic Single-Pixel Illumination With Deep Learning Networks, Jin Li et al., IEEE, 2020, pp. 2550-2558 (Year: 2020).*

(Continued)

*Primary Examiner* — Jayesh A Patel
(74) *Attorney, Agent, or Firm* — Fish & Richardson P.C.

(57) ABSTRACT

Provided are methods for maintaining intrinsic calibration of IBIS cameras, which can include obtaining a first camera sensor position at which a movable sensor of a camera is positioned when the camera captures a first image, selecting, from at least one database including a plurality of intrinsic calibration data sets indexed by a respective plurality of second camera sensor positions, one of the plurality of second camera sensor positions based on the first camera (Continued)

sensor position of the movable sensor, retrieving, from the at least one database and for the camera, a first intrinsic calibration data set, of the plurality of intrinsic calibration data sets, that is indexed by the selected one of the plurality of second camera sensor positions, and rectifying, by the at least one processor, the first image using the first intrinsic calibration data set of the camera retrieved from the at least one database.

18 Claims, 10 Drawing Sheets

(56) References Cited

U.S. PATENT DOCUMENTS

| | | | | |
|---|---|---|---|---|
| 2013/0331145 | A1* | 12/2013 | Liao | G06T 7/593 |
| | | | | 455/556.1 |
| 2015/0332098 | A1* | 11/2015 | Wang | G06T 7/73 |
| | | | | 382/103 |
| 2016/0012588 | A1* | 1/2016 | Taguchi | H04N 13/204 |
| | | | | 348/46 |
| 2019/0058870 | A1* | 2/2019 | Rowell | H04N 13/189 |
| 2019/0293756 | A1* | 9/2019 | Blaes | G01S 7/4026 |
| 2019/0329407 | A1* | 10/2019 | Qi | G05D 1/0248 |
| 2021/0166428 | A1* | 6/2021 | Kehl | H04N 17/002 |
| 2021/0387573 | A1* | 12/2021 | Hinson | B60W 50/14 |
| 2022/0005226 | A1* | 1/2022 | Nir | G06T 7/80 |
| 2022/0383585 | A1* | 12/2022 | Lee | G06T 15/08 |
| 2023/0095500 | A1* | 3/2023 | Cheng | G06T 7/74 |
| | | | | 348/143 |
| 2023/0245345 | A1* | 8/2023 | Peuhkurinen | G06T 7/73 |
| | | | | 382/155 |

FOREIGN PATENT DOCUMENTS

| | | | | |
|---|---|---|---|---|
| EP | | 3940643 | 1/2022 | |
| FR | | 2981533 | 4/2018 | |
| GB | | 2560948 A | * 10/2018 | G06T 7/80 |

OTHER PUBLICATIONS

Real-Time, Full 3-D Reconstruction of Moving Foreground Objects From Multiple Consumer Depth Cameras, Dimitrios S. Alexiadis et al., IEEE, 2013, pp. 339-358 (Year: 2013).*

Camera calibration method based on optimal polarization angle, Zhenmin Zhu et al., Elsevier, 2019, pp. 128-135 (Year: 2019).*

Camera Calibration without Feature Extraction, Luc Robert, Inria, 1996, pp. 314-325 (Year: 1996).*

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.

International Search Report and Written Opinion in International Appln. No. PCT/US2023/030392, mailed on Nov. 14, 2023, 10 pages.

* cited by examiner

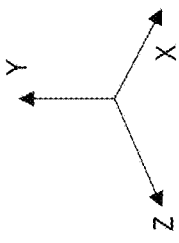
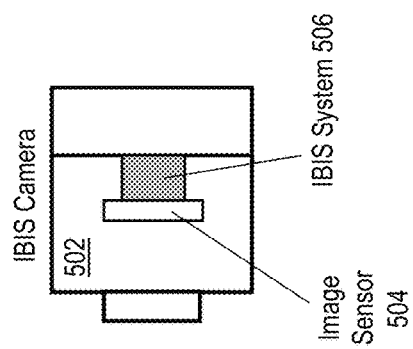
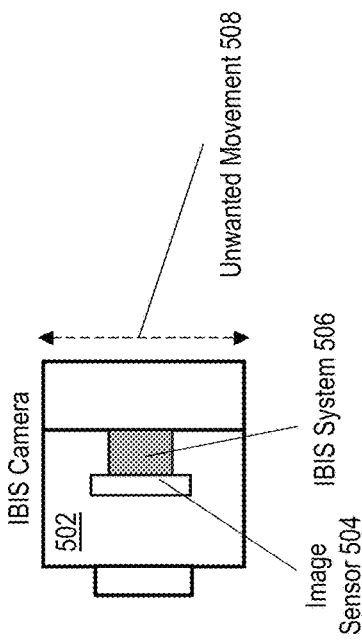
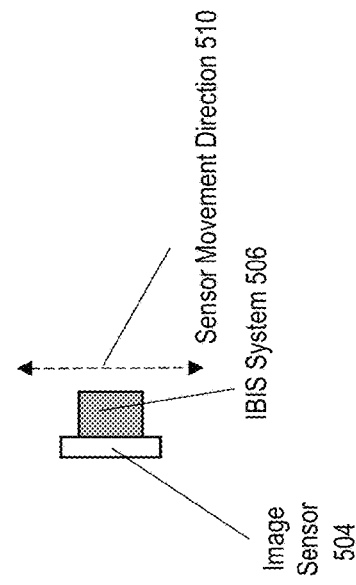
FIG. 5A
FIG. 5B
FIG. 5C

MAINTAINING INTRINSIC CALIBRATION OF CAMERAS WITH IN-BODY IMAGE STABILIZATION SYSTEMS

BACKGROUND

Vehicles, such as autonomous vehicles, use sensors to identify objects in their surrounding environment. These sensors include cameras, LiDAR sensors, radar sensors, and other types of sensors. Further, sensors included in these vehicles may be calibrated using various tools and techniques for ensuring correct operation and enabling the capture of images with, e.g., minimal errors, occlusions, and so forth.

BRIEF DESCRIPTION OF THE FIGURES

FIG. 5A illustrates an IBIS camera including an IBIS system for effectuating movement of the image sensor to ensure compensation for unwanted camera motion, according to one or more embodiments described and illustrated herein;

FIG. 5B illustrates an example unwanted movement of the IBIS camera in a particular direction, according to one or more embodiments described and illustrated herein;

FIG. 5C illustrates the image sensor moving in a particular direction in response to unwanted movement of the IBIS camera, according to one or more embodiments described and illustrated herein;

DETAILED DESCRIPTION

Figure 1:
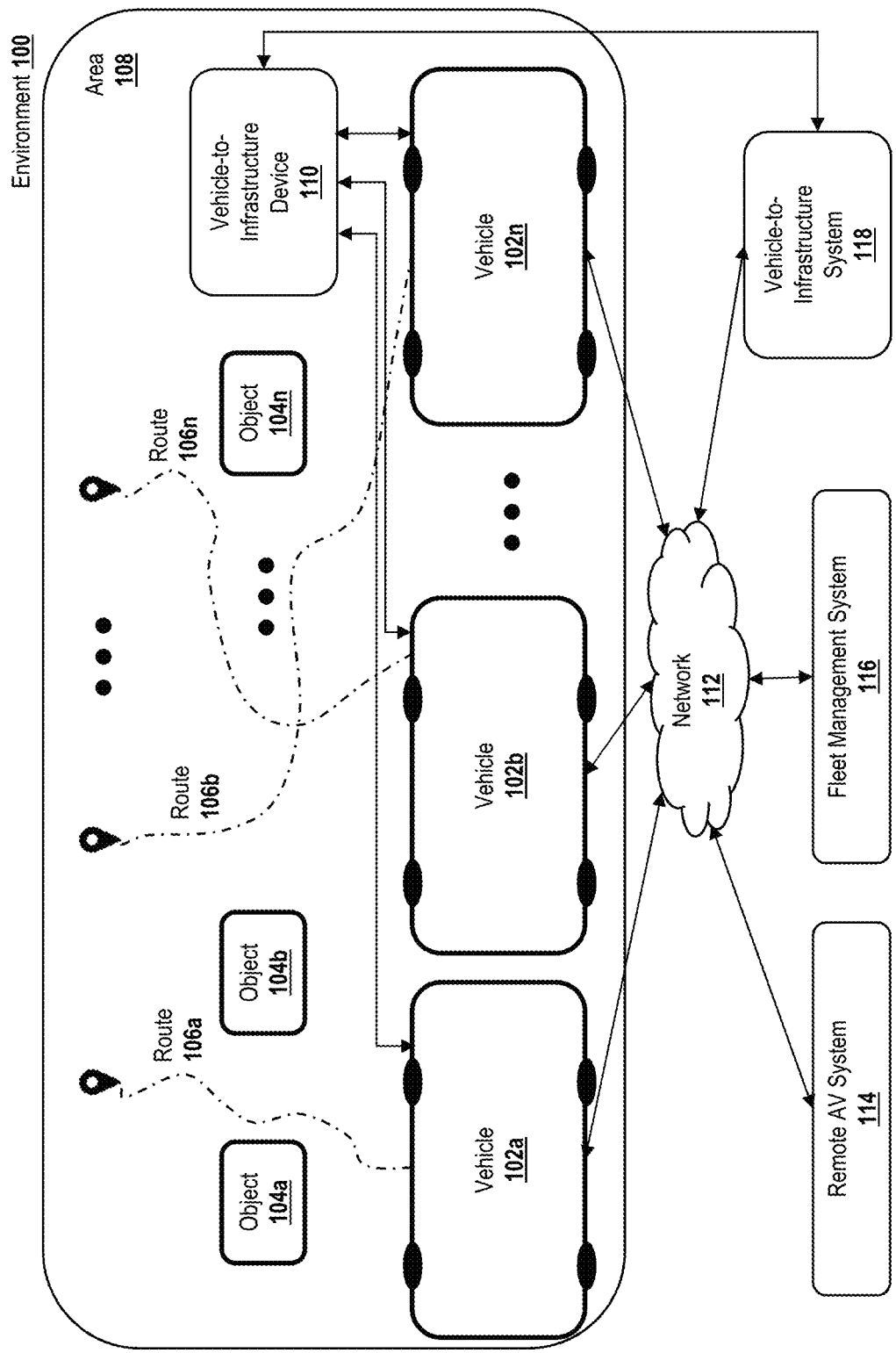
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like).

For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

A vehicle, such as an autonomous vehicle (AV), has a camera that includes an in-body image stabilization (IBIS) system for perception of the environment around the vehicle and is calibrated in a manner that compensates for unwanted motion. An IBIS system improves the performance of a camera that is in motion (e.g., a camera positioned on a moving vehicle) by moving the camera's sensor to counteract the effects of the motion of the camera on the camera sensor, such as motion blur. The movement of the camera sensor by the IBIS system, however, renders the intrinsic calibration values of the camera invalid for vehicle environment perception purposes, as these values were determined when the camera sensor was in a fixed position. An on-board (e.g., on the vehicle) corrective algorithm that uses values generated by an intrinsic calibration process allows the intrinsic calibration of cameras within IBIS systems to be maintained, particularly when these cameras are in motion, e.g., due to the movement of vehicles on which these cameras are positioned.

An intrinsic calibration maintenance process, as described in the present disclosure, allows for intrinsic calibration of movable camera sensors included in IBIS-enabled cameras. Such a calibration process provides the benefits of the IBIS systems to the cameras installed on the vehicle, thereby improving the ability of the cameras to perceive an environment that is external to the vehicle. Additionally, the intrinsic calibration maintenance process described in the present disclosure improves the path planning and motion control capabilities of the vehicle. Example benefits of the intrinsic calibration maintenance process include reduced frame-to-frame jitters and motion blurs, correction of alignment and decentration errors, higher camera exposure times, and an increased field of view for the camera. Additionally, the use of a complementary metal oxide semiconductor ("CMOS") image sensor with a global shutter feature improves the ability of the IBIS cameras to capture images that aid in the perception of the environment around the vehicle. For example, the CMOS image sensor enables capturing images that facilitate, e.g., a machine learning model, to more accurately detect and classify objects represented in the captured images.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102a) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
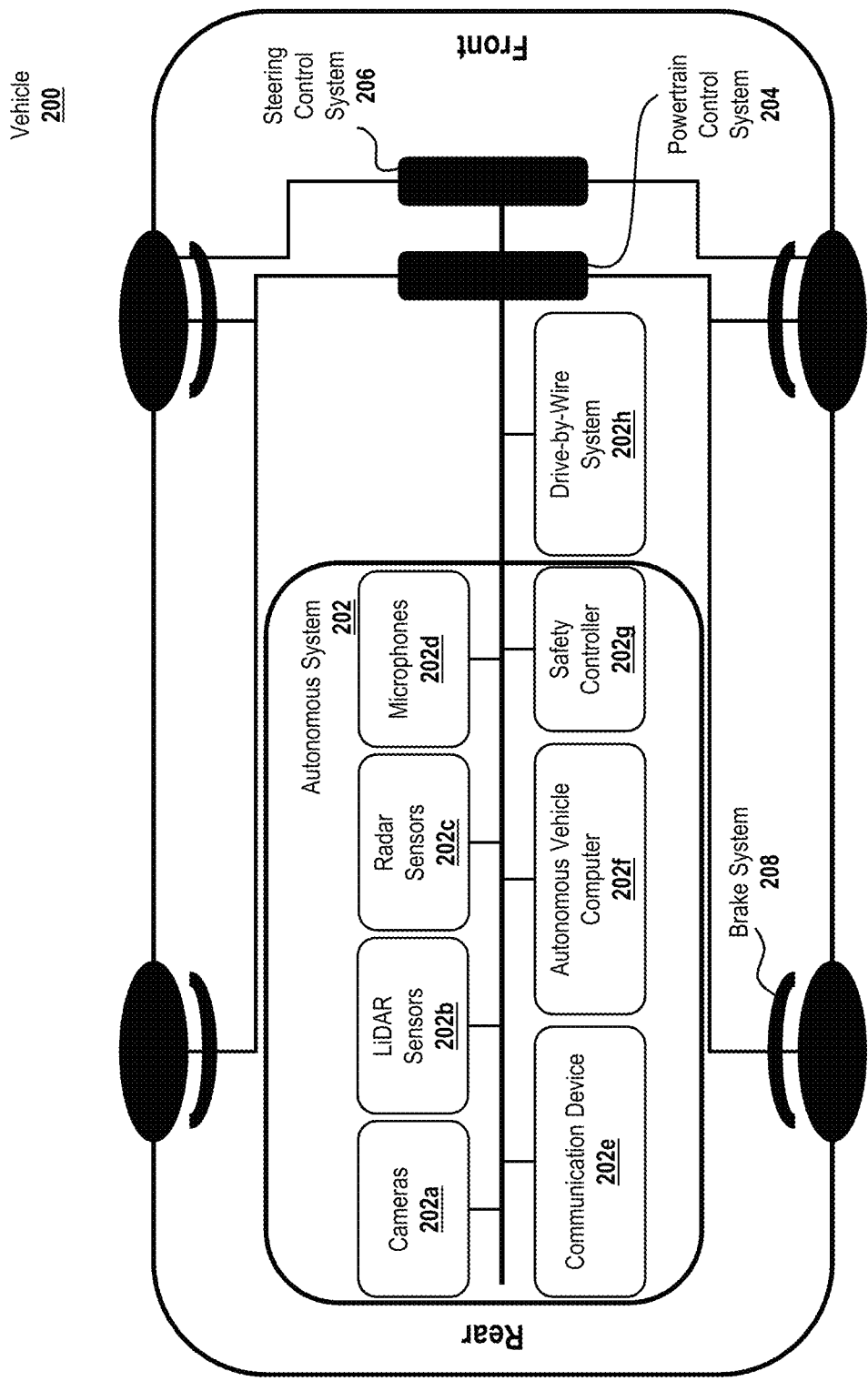
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle computer 202f, drive-by-wire (DBW) system 202h, and safety controller 202g.

Figure 3:
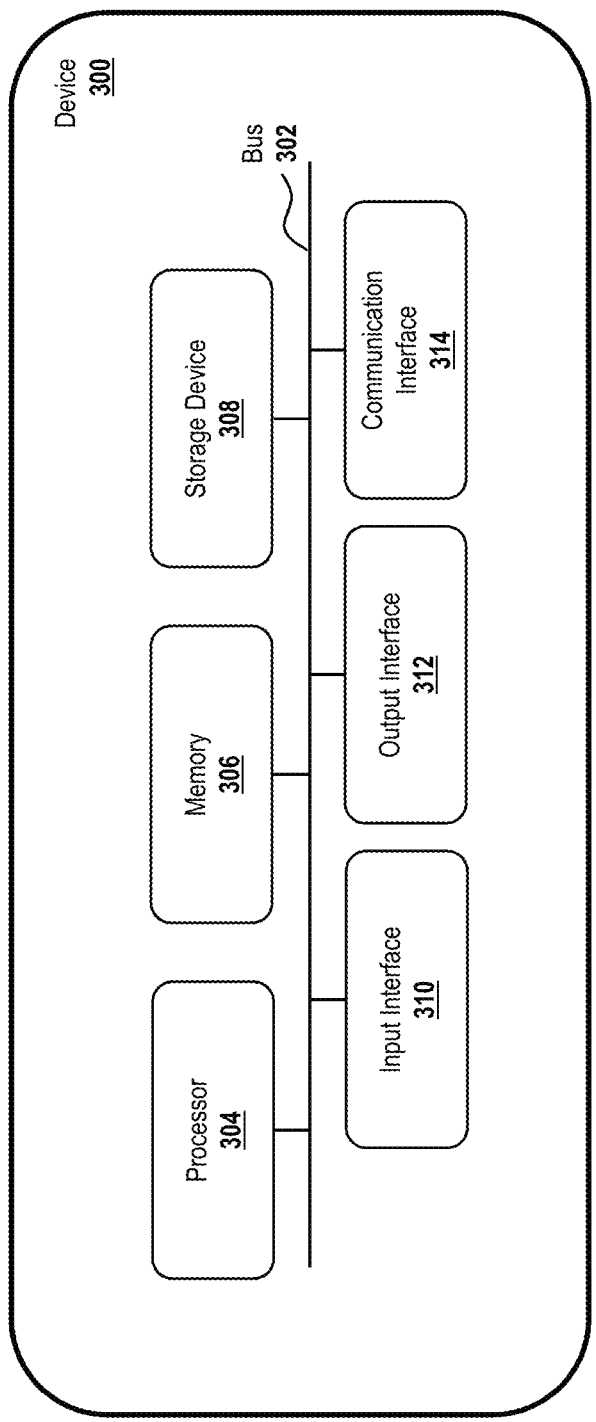
FIG. 3 is a diagram of components of one or more devices and/or one or more systems of FIGS. 1 and 2.

Cameras 202a include at least one device configured to be in communication with communication device 202e, autonomous vehicle computer 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle computer 202f and/or a fleet management system (e.g., a fleet management system that is the same as or similar to fleet management system 116 of FIG. 1). In such an example, autonomous vehicle computer 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle computer 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle computer 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle computer 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle computer 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle computer 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle computer 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle computer 202f is the same as or similar to autonomous vehicle computer 400, described herein. Additionally, or alternatively, in some embodiments, the autonomous vehicle computer 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle computer 202f.

DBW system 202h includes at least one device configured to be in communication with communication device 202e and/or autonomous vehicle computer 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments, the input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
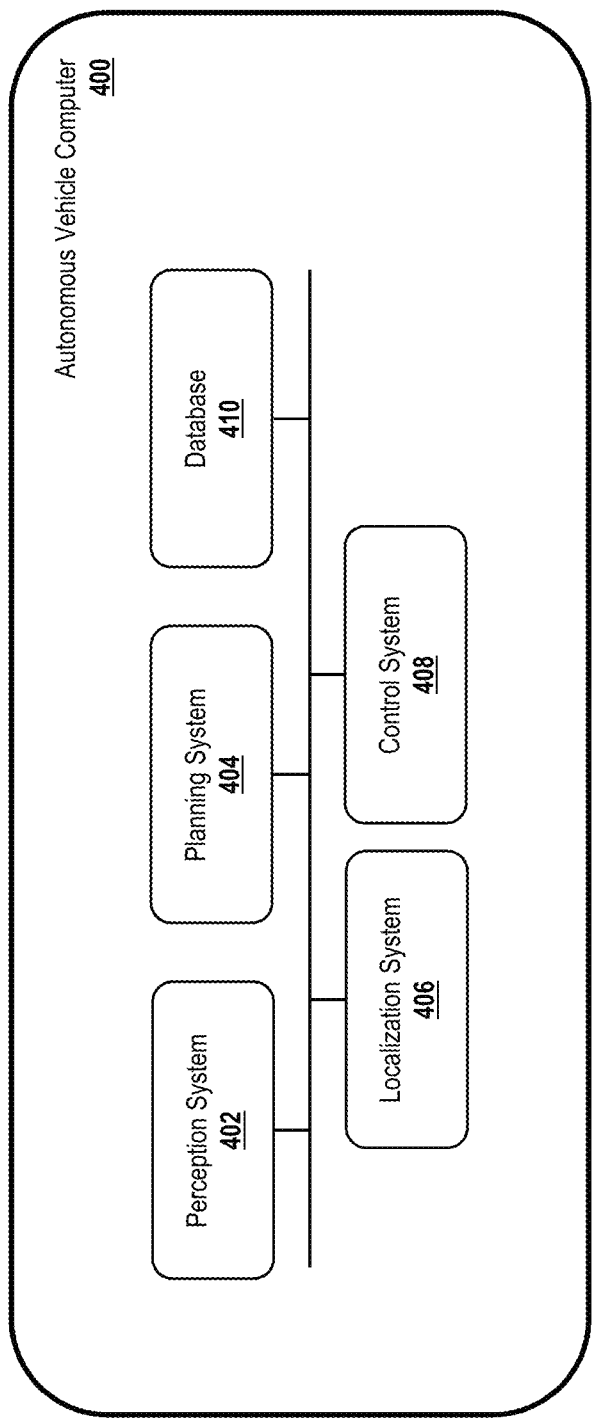
FIG. 4 is a diagram of certain components of an autonomous system.

Referring now to FIG. 4, illustrated is an example block diagram of an autonomous vehicle computer 400 (sometimes referred to as an "AV stack"). As illustrated, autonomous vehicle computer 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle computer 202f of vehicle 200). Additionally, or alternatively, in some embodiments, the perception system 402, planning system 404, localization system 406, control system 408, and database 410 are included in one or more standalone systems (e.g., one or more systems that are the same as or similar to autonomous vehicle computer 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle computer 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle computer 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle computer 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 6A:
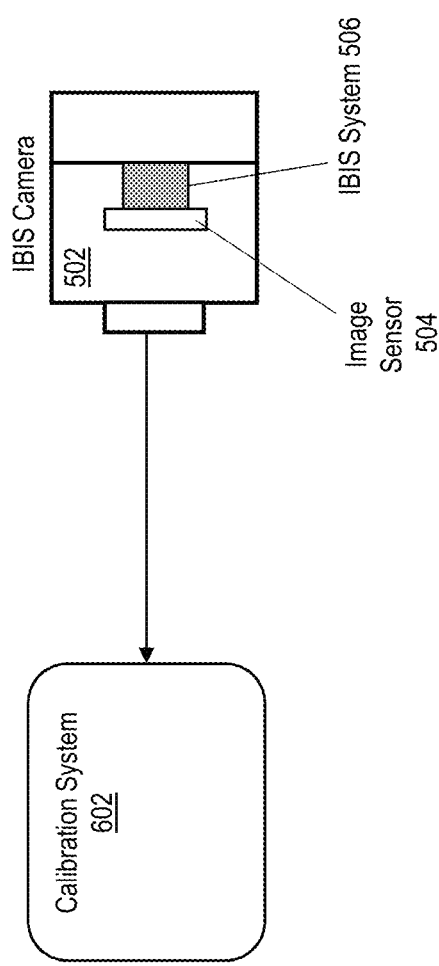
FIG. 6A illustrates various subcomponents of the IBIS camera and a positioning of the IBIS camera relative to a calibration system to calibrate the IBIS camera using the DOE based geometric camera calibration technique, according to one or more embodiments described and illustrated herein.
Figure 6B:
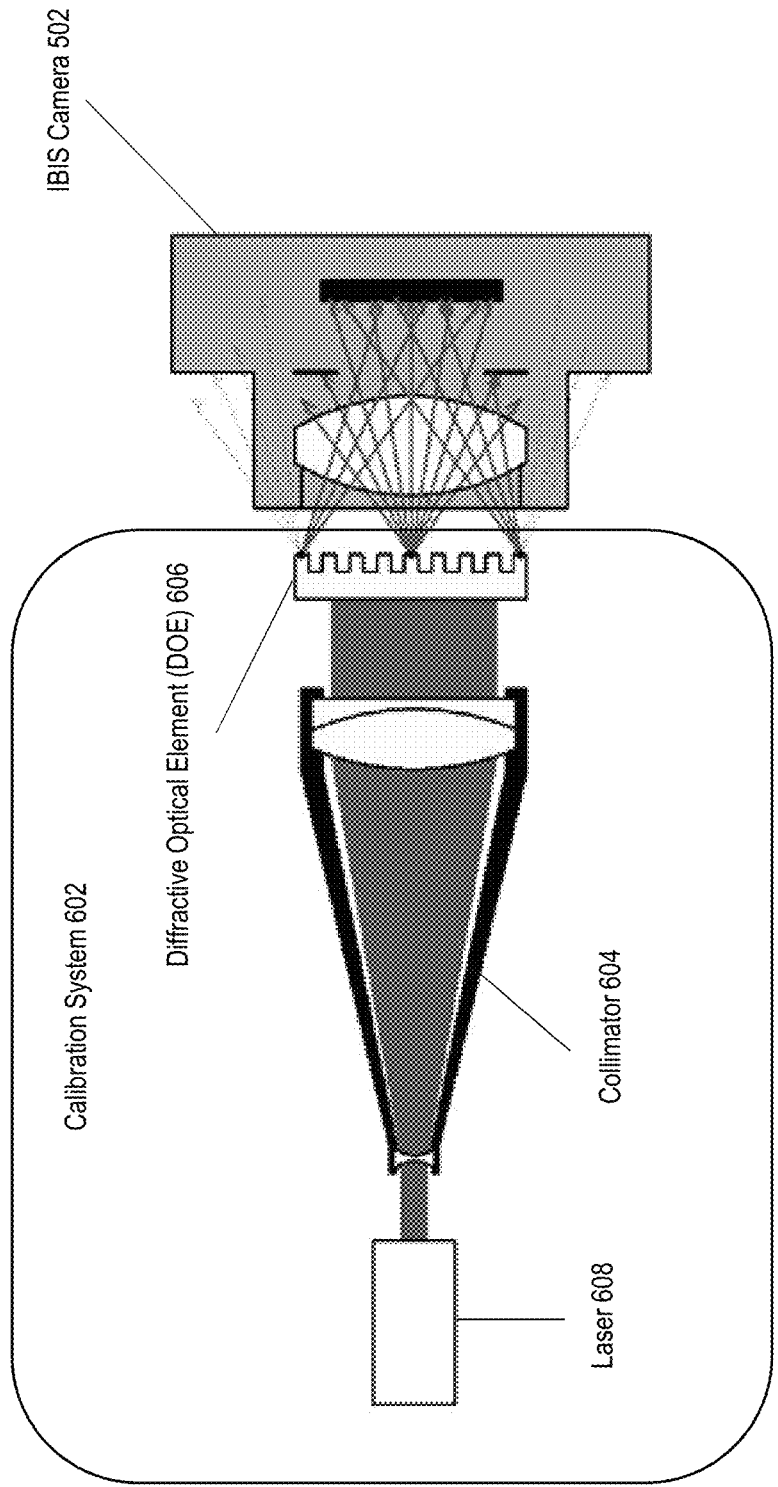
FIG. 6B illustrates various components included as part of the calibration system of the present disclosure and an alignment of the IBIS camera with the calibration system, according to one or more embodiments described and illustrated herein.
Figure 7:
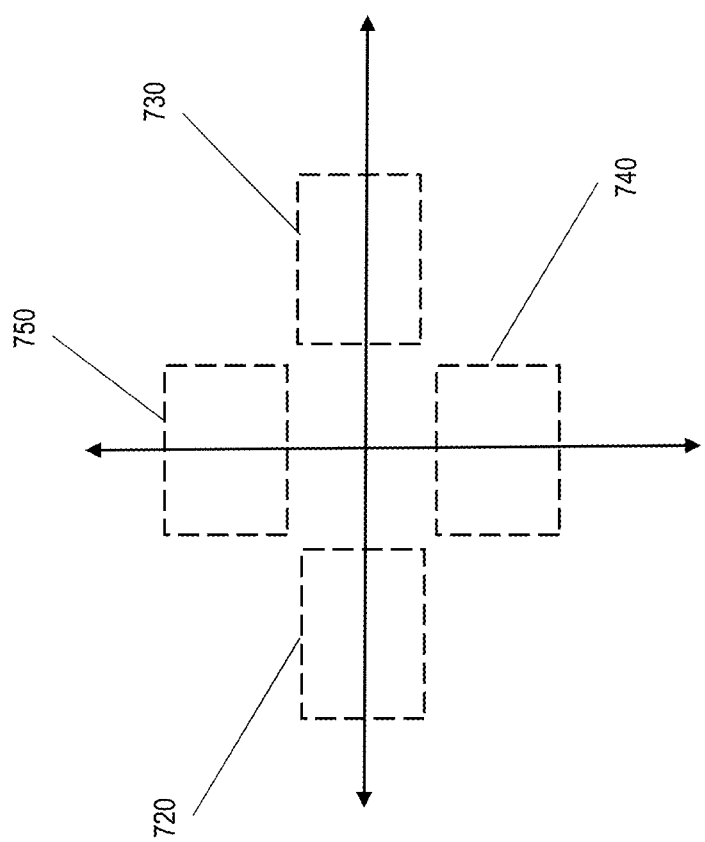
FIG. 7 illustrates maximum and minimum coordinates as part of the DOE based geometric calibration of the IBIS camera, according to one or more embodiments described and illustrated herein.
Figure 8:
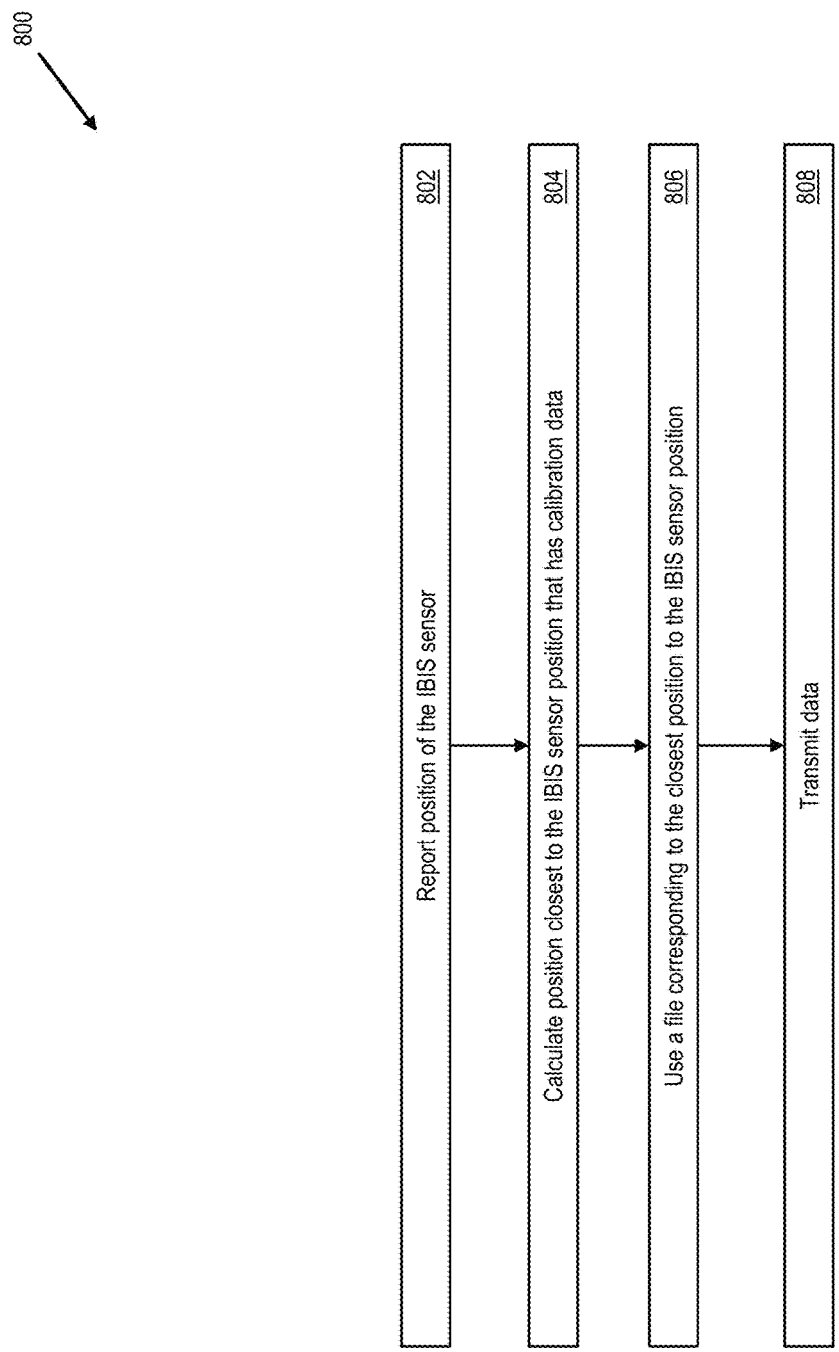
FIG. 8 illustrates a workflow describing operation of the IBIS camera during movement of a vehicle, according to one or more embodiments described and illustrated herein.
Figure 9:
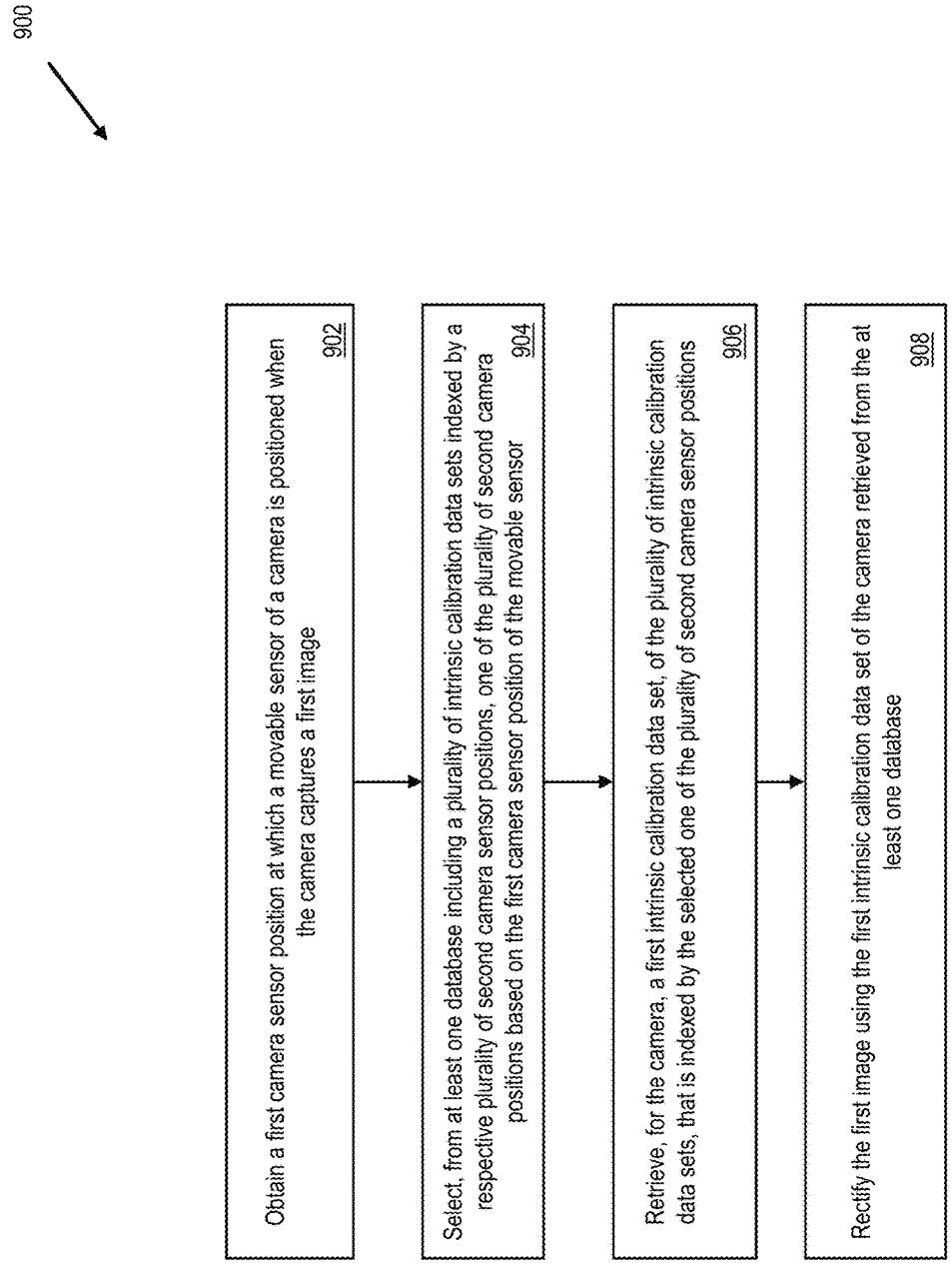
FIG. 9 illustrates a flowchart of a process for maintaining intrinsic calibration of an IBIS camera, according to one or more embodiments described and illustrated herein.

FIGS. 5A-5C illustrate an IBIS camera and various associated components. FIGS. 6A, 6B, and 7 illustrate a diffractive optical element (DOE) based geometric camera calibration technique that is utilized for calibrating the IBIS camera. FIGS. 8 and 9 illustrate an implementation of an algorithm that enables the maintenance of the intrinsic calibration of the IBIS camera positioned on a vehicle (e.g., 102*a* illustrated in FIG. 1).

As stated, FIGS. 5A-5C illustrate an IBIS camera 502 with various components included therein. In some embodiments, the IBIS camera 502 is an example of one of the cameras 202*a* (FIG. 2), which is positioned within the autonomous system 202 of the vehicle 200. IBIS (in-body image stabilization) is a functionality that reduces vibration of an image sensor 504 that is included within the camera. The vibration is caused by, e.g., movement of the vehicle along a city street, highway, and so forth. In embodiments, vibration and/or frame-to-frame movement experienced by the image sensor 504 is reduced by moving the image sensor 504 of the IBIS camera 502 in a manner that compensates for unwanted movement of the vehicle. As a result, as the vehicle 200 moves and encounters conditions that cause vibration and other comparable forms of unwanted movement due to, e.g., contact with potholes, turning during navigation, starting and stopping, etc., images captured by the IBIS camera 502 are relatively stable and exhibit minimal changes, errors, occlusions, and so forth.

As illustrated in FIG. 5A, the IBIS camera 502 includes an IBIS system that effectuates the movement of the image sensor 504 in a manner that ensures compensation for any unwanted camera motion. FIG. 5B illustrates an example unwanted movement 508 of the IBIS camera 502 in a particular direction, e.g., movement in the y direction. In embodiments, the unwanted movement occurs in other directions as well, e.g. x direction. In embodiments, it is noted that the IBIS system described in the present disclosure is configured to correct and compensate for movement based on pitch and yaw of the IBIS camera 502. FIG. 5C illustrates the image sensor 504 in isolation. In particular, FIG. 5C illustrates the image sensor 504 moving in a sensor movement direction 510, e.g., in the y-direction, to compensate for unwanted movement 508 of the IBIS camera 502.

Broadly speaking, in order to enable the IBIS system 506 to effectuate movement of the image sensor 504 as described above, a calibration process is implemented. In some embodiments, the diffractive optical element (DOE) based geometric camera calibration technique is utilized to calibrate the IBIS camera 502 for maintaining an intrinsic calibration of the camera. Alternatively, other calibration techniques, e.g., Zhang camera calibration, may also be utilized. In some embodiments, as part of the DOE based geometric camera calibration technique, the IBIS camera 502 is in a static position and optical components of the IBIS camera 502 are aligned with one or more diffractive optical elements. Thereafter, the image sensor 504 is moved to various positions within the x-y coordinate system and one or more images are captured when the image sensor 504 is oriented at each of these positions. Thereafter, in some embodiments, a polynomial fit is generated for each of these positions. Thereafter, an output is generated, namely an output in the form of a calibration dataset. The calibration dataset includes a plurality of points or positions in the x-y coordinate system in which the image sensor 504 was oriented, image data specific to one or more images captured at each of the point or positions, and a number of intrinsic parameters specific to each of the points or positions.

Thereafter, the calibrated IBIS camera 502 is positioned on a moving vehicle and operates to maintain a particular threshold level of intrinsic calibration using the generated calibration dataset. For example, in some embodiments, as a vehicle (e.g., vehicle 102*a*) including the IBIS camera 502 travels through a city street, the IBIS camera 502 is, automatically and without user intervention, oriented in a particular position for the purposes of capturing one or more images of an external environment. The captured images are be utilized for path planning, collision avoidance, and so forth. Upon capturing the images, the IBIS camera 502 identifies a current position of the image sensor 504 (e.g., the position in which the one or more images were captured) and routes or transmits position data associated with the current position to the autonomous vehicle computer 400. In some embodiments, the autonomous vehicle computer 400, operating independently or in conjunction with the device 300, accesses a calibration dataset that is specific to the IBIS camera 502. In embodiments, the autonomous vehicle computer 400, operating independently or in conjunction with the device 300, searches through the calibration dataset and determines one or more coordinates that are within a particular proximity, e.g., a proximity threshold, of the current position of the image sensor 504.

Upon determining the one or more coordinates that satisfy the proximity threshold, the autonomous vehicle computer 400 selects one or more calibration files corresponding to the one or more coordinates. Further, the autonomous vehicle computer 400 instructs the IBIS system to utilize the calibration data included in the selected calibration files in association with the current position of the image sensor 504. This operation is repeated at additional positions in which the image sensor 504 is oriented, e.g., different positions in which the image sensor 504 is positioned when the IBIS camera 502 captures additional images of an environment that is external to the vehicle. Data associated with each position and every image captured at each position is stored in memory of the IBIS camera 502 and/or memory 306 of the device 300. Additionally, data associated with each position and one or more images captured at each position is incorporated into a calibration dataset, which is dynamically updated. Data specific to each image is also routed to the perception system 402 for further analysis. In this way, the intrinsic calibration of the IBIS camera 502 is maintained for facilitating the capture of images that enable accurate perception of an environment that is external to the vehicle.

FIG. 6A illustrates various subcomponents of the IBIS camera 502 and a positioning of the IBIS camera 502 relative to a calibration system 602 for calibrating the IBIS camera 502 using the DOE based geometric camera calibration technique, according to one or more embodiments described and illustrated herein. As illustrated, the IBIS camera 502 includes the image sensor 504. Further, as part of the DOE based geometric camera calibration, one or more optical elements of the IBIS camera 502 is aligned directly in front of the calibration system 602.

FIG. 6B illustrates various components included as part of the calibration system 602 and an alignment of the IBIS camera 502 with one or more of the components within the calibration system 602, according to one or more embodiments described and illustrated herein. As illustrated, the calibration system 602 includes a laser 608, e.g., a mixed-gas argon or krypton ion laser that is operable to generate a focused laser beam, a collimator 604, and an example diffractive optical element 606. In some embodiments, the laser 608 generates a laser beam that enters the collimator 604. The collimator 604 operates to narrow the beam. The narrowed beam is then expanded to, e.g., a diameter of 78 millimeters, by an expander (not shown). The expanded or enlarged beam is diffracted by the example diffractive optical element 606, which is positioned directly in front of one or more optical elements of the IBIS camera 502, e.g., camera lens of the IBIS camera 502. Diffractive optical elements are phase relief elements that utilize micro-structures to alter the phase of light that propagates through these elements for the purpose of manipulating the light in various ways. The alteration enables the diffractive optical elements to produce beam intensity profiles and beam shapes for various applications.

For appropriate calibration, in embodiments, the diameter of the incident laser beam and the diameter of the diffractive optical element area is designed to be substantially equal to the aperture diameter of the optical element of the IBIS camera 502. Further, in embodiments, the diffracted beams are oriented such that the beams are focused within the image plane of the camera, as illustrated in FIG. 6B. To ensure that the diffracted laser beam contacts a substantial portion of the surface area of the image sensor 504, a maximum diffraction angle of the diffractive optical element is designed to be larger than a field of view of the IBIS camera 502.

FIG. 7 illustrates maximum coordinates values as part of the DOE based geometric camera calibration of the IBIS camera 502, according to one or more embodiments described and illustrated herein. In particular, with the alignment of the IBIS camera 502 and the calibration system 602 as illustrated in FIG. 6B, the DOE based geometric camera calibration technique is implemented by, e.g., performing the following steps: (1) maintaining the IBIS camera 502 in a static position, (2) moving the image sensor 504 within the x-y coordinate system to, e.g., a first coordinate $(x_1, y_1)$ position, (3) capturing one or more images with the image sensor 504 positioned at the first coordinate position, (4) moving the image sensor 504 to a plurality of additional positions and capturing respective one or more images at each of the additional positions, and (5) generating polynomial fits for each of the positions in which the image sensor 504 is oriented.

Further, in some embodiments, the result of the performance of the above steps enables the determination of a plurality of intrinsic calibration parameters for each coordinate position of the image sensor 504, e.g., $f_x$, $f_y$, $C_x$, $C_y$, $K_1$, $K_2$, $K_3$, $P_1$, and $P_2$. The terms $f_x$ and $f_y$ correspond to the x-axis focal length and the y-axis focal length of the IBIS camera 502 (in pixels), while $C_x$ and $C_y$ correspond to the x-axis optical center and the y-axis optical center of the IBIS camera 502 (in pixels). Additionally, $K_1$, $K_2$, and $K_3$ correspond to radial distortion values and $P_1$, and $P_2$ correspond to decentering distortion values. Each of these values, which varies for each coordinate position of the image sensor 504, is stored in respective calibration files specific to each coordinate position. Moreover, data specific to the captured image, data specific to the polynomial fitting process, and other data associated with the coordinate positions are stored as part of the calibration dataset, which includes the calibration files specific to each coordinate position. The coordinate positions is bounded by a maximum negative x-value 720, a maximum positive x-value 730, a maximum negative y-value 740, and a maximum positive y-value 750. In other words, all of the coordinate positions in which the image sensor 504 is oriented fall within these maximum x and y values. It is contemplated that the maximum x and y values are variable.

FIG. 8 illustrates a workflow 800 describing operation of the IBIS camera 502 during movement of a vehicle in which the IBIS camera 502 is positioned, according to one or more embodiments described and illustrated herein. In particular, as a vehicle travels along a route, e.g., a highway, a city street, and so forth, the autonomous vehicle computer 400 activates and orients the IBIS camera 502 included in the vehicle in a particular direction, e.g., to capture, in real time, images of various objects within an environment that is external to the vehicle (e.g., vehicle 102a shown in FIG. 1). While the vehicle travels along a particular route, the IBIS camera 502 performs particular functions to ensure that the camera, and in particular, the image sensor 504 of the IBIS camera 502, operates under appropriately calibrated conditions.

To this end, the IBIS camera 502 identifies a current position of the image sensor 504 and routes or transmits position data associated with the current position to the autonomous vehicle computer 400. The autonomous vehicle computer 400, operating independently or in conjunction with the device 300, accesses a calibration dataset stored in memory of the IBIS camera 502 and/or in the memory 306 of the device 300. The autonomous vehicle computer 400, operating independently or in conjunction with the device 300, then searches through the calibration dataset and determines one or more coordinates that are within a particular proximity, e.g., a proximity threshold, of the current position of the image sensor 504. In embodiments, if a proximity threshold value is not satisfied, one or more interpolation operations are performed between the current position of the image sensor 504 and the closest coordinate position. The result of the interpolation operation is incorporated into the calibration dataset.

Further, data specific to a frame (e.g., an image that is captured when the image sensor 504 was in the current position) is routed to the perception system 402 for additional analysis. In embodiments, the perception system 402 of the autonomous vehicle computer 400, operating independently or in conjunction with the device 300, rectifies an image captured at the current position using a calibration file from the calibration dataset (e.g., first intrinsic calibration dataset). The classification of the at least one object is according to various criteria stored in memory (e.g., memory 306) of the vehicle. In some embodiments, the autonomous vehicle computer 400 orients the image sensor 504 to a new position, captures a new image at the new position, and determines whether a distance value between the previously current position and the new position satisfies a threshold. If it is determined that the threshold is satisfied, the perception system 402 of the autonomous vehicle computer 400 rectifies the new image based on the calibration data file that is utilized with respect to the image captured relative to the previous position.

FIG. 9 illustrates a flowchart of a process 900 for maintaining intrinsic calibration of an IBIS camera. In some embodiments, one or more of the steps described with respect to process 900 are performed (e.g., completely, partially, and/or the like) by the autonomous vehicle computer 400 operating in conjunction with the IBIS camera 502 (FIG. 6B). Additionally, or alternatively, in some embodiments, one or more steps described with respect to process 900 are performed (e.g., completely, partially, and/or the like) by another device or group of devices separate from or including the autonomous vehicle computer 400 and the IBIS camera 502. In particular, one or more devices included as part of the, e.g., the device 300.

With continued reference to FIG. 9, the autonomous vehicle computer 400 operating in conjunction with the IBIS camera 502 obtains a first camera position at which a movable sensor of the IBIS camera 502 is positioned when the camera captures a first image (block 902).

For example, the first camera sensor position refers to at least a coordinate (e.g., [x, y]) on a two dimensional coordinate plane. In embodiments, as stated above, the IBIS camera 502 is installed as part of a vehicle, e.g., 102a as illustrated in FIG. 1. Further, the IBIS camera 502 causes the movable sensor to move within the IBIS camera 502, in particular, in response to an unwanted movement of the vehicle, e.g., vehicle 102a. The coordinates correspond to a particular position or orientation of a movable sensor, namely a position in which the IBIS camera 502 captures one or more images.

The autonomous vehicle computer 400 operating in conjunction with the IBIS camera 502 selects, from at least one database including a plurality of intrinsic calibration data sets indexed by a respective plurality of second camera sensor positions, one of the plurality of second camera sensor positions based on the first camera sensor position of the movable sensor (block 904). For example, in embodiments, the plurality of intrinsic calibration datasets includes a set of nine intrinsic parameter such as x and y components of the focal length, the optical center, and a set of distortion parameters, e.g., five distortion parameters $K_1$, $K_2$, $K_3$, $P_1$, and $P_2$. In embodiments, the intrinsic parameters in the plurality of intrinsic calibration data sets are generated using a diffractive optical element (DOE) geometrical camera calibration technique. Further, the selection of one of the plurality of second camera sensor positions based on the first camera sensor position comprises selecting the one of the plurality of second camera sensor positions that is closest to the first camera sensor position. It is noted that, in embodiments, the plurality of intrinsic calibration datasets could be generated using a Zhang camera calibration method.

With continued reference to FIG. 9, the autonomous vehicle computer 400 retrieves, from the at least one database and for the camera, a first intrinsic calibration dataset, of the plurality of intrinsic calibration data sets, that is indexed by the selected one of the plurality of second camera sensor positions (block 906). Finally, with continued reference to FIG. 9, the autonomous vehicle computer 400 rectifies the first image using the first intrinsic calibration data set of the camera retrieved from the at least one database (block 908). In some embodiments, both the first camera and the second camera is the IBIS camera 502.

In some embodiments, the autonomous vehicle computer 400 is further configured to classify at least one object that is represented in the image that is rectified. Prior to classifying the at least one object represented in a captured image, the image that is rectified may be provided to the perception system 402 of the autonomous vehicle computer 400. In embodiments, the autonomous vehicle computer 400, operating independently or in conjunction with the device 300 obtains second camera sensor position at which the movable sensor of the IBIS camera 502 is positioned, namely when the IBIS camera 502 captures another image (e.g., a second image). Further, in embodiments, the autonomous vehicle computer 400, operating independently or in conjunction with the device 300, may determine a distance between the position in which the image sensor 504 was oriented when the second image was taken and a different position in which the image sensor 504 was oriented, e.g., when a previous image (e.g., a first image) was captured.

In embodiments, the autonomous vehicle computer 400 operates to rectify the second image using the calibration files from the calibration dataset that is specific to the previous image (e.g., a first image) without retrieving any other calibration files from the calibration dataset (e.g., any other intrinsic calibration data included in the calibration dataset) from the database.

Further, in some embodiments, the autonomous vehicle computer 400 operates to select another one of a plurality of positions of the image sensor 504, namely one or more positions that is closest to a particular position of the image sensor 504, e.g., in response to determining the distance between the position in which the image sensor 504 was oriented when the second image was taken and a different position in which the image sensor 504 was oriented, e.g., when a previous image (e.g., a first image) was captured. The autonomous vehicle computer 400 also retrieves additional calibration files from the calibration dataset (e.g., a second intrinsic calibration dataset) and rectifies the second image using the additional calibration files.

According to some non-limiting embodiments or examples, provided is a method of intrinsic camera calibration, comprising:

obtaining, using at least one processor, a first camera sensor position at which a movable sensor of a camera is positioned when the camera captures a first image;

selecting, by the at least one processor and from at least one database including a plurality of intrinsic calibration data sets indexed by a respective plurality of second camera sensor positions, one of the plurality of second camera sensor positions based on the first camera sensor position of the movable sensor;

retrieving, from the at least one database and for the camera, a first intrinsic calibration data set, of the plurality of intrinsic calibration data sets, that is indexed by the selected one of the plurality of second camera sensor positions; and rectifying, by the at least one processor, the first image using the first intrinsic calibration data set of the camera retrieved from the at least one database.

Further non-limiting aspects or embodiments are set forth in the following numbered clauses:

Clause 1: A method, comprising: obtaining, by at least one processor, a first camera sensor position at which a movable sensor of a camera is positioned when the camera captures a first image; selecting, by the at least one processor and from at least one database including a plurality of intrinsic calibration data sets indexed by a respective plurality of second camera sensor positions, one of the plurality of second camera sensor positions based on the first camera sensor position of the movable sensor; retrieving, from the at least one database and for the camera, a first intrinsic calibration data set, of the plurality of intrinsic calibration data sets, that is indexed by the selected one of the plurality of second camera sensor positions; and rectifying, by the at least one processor, the first image using the first intrinsic calibration data set of the camera retrieved from the at least one database.

Clause 2: The method of clause 1, classifying, by the at least one processor, at least one object represented in the rectified first image.

Clause 3: The method of clause 1 or 2, wherein the camera is configured on a vehicle.

Clause 4: The method of clause 3, further providing, by the at least one processor, the rectified first image to a perception system of the vehicle to classify at least one object represented in the rectified first image.

Clause 5: The method of any of clauses 1-4, wherein the camera includes an in-body image stabilization system capable of causing the movable sensor to move within the camera.

Clause 6: The method of clause 5, wherein the camera is configured on a vehicle; and the IBIS system causes the movable sensor to move in response to a movement of the vehicle.

Clause 7: The method of any of clauses 1-6, wherein the selecting the one of the plurality of second camera sensor positions based on the first camera sensor position includes selecting the one of the plurality of second camera sensor positions that is closest to the first camera sensor position.

Clause 8: The method of any of clauses 1-7, wherein intrinsic parameters in the plurality of intrinsic calibration data sets are generated by a diffractive optical element (DOE) geometrical camera calibration technique.

Clause 9: The method of any of clauses 1-8, wherein intrinsic parameters in the plurality of intrinsic calibration data sets are generated by a Zhang camera calibration method.

Clause 10: The method of any of clauses 1-9, further comprising: obtaining, by the at least one processor, a second camera sensor position at which the movable sensor of the camera is positioned when the camera captures a second image; and determining, using the at least one processor, that a distance between the second camera sensor position and the first camera sensor position satisfies a threshold.

Clause 11: The method of clause 10, further comprising: rectifying, by the at least one processor and in response to the determining, the second image using the first intrinsic calibration data set of the camera without retrieving any other intrinsic calibration data set from the at least one database.

Clause 12: The method of clause 10, further comprising: selecting, by the at least one processor and from the at least one database, another one of the plurality of second camera sensor positions that is closest to the second camera sensor position in response to the determining; retrieving, from the at least one database and for the camera, a second intrinsic calibration data set, of the plurality of intrinsic calibration data sets, that is indexed by the selected another one of the plurality of second camera sensor positions; and rectifying, by the at least one processor, the second image using the second intrinsic calibration data set of the camera retrieved from the at least one database.

Clause 13: A system comprising at least one processor and at least one non-transitory storage media storing instructions that, when executed by the at least one processor, cause the at least one processor to perform operations comprising: obtaining, by the at least one processor, a first camera sensor position at which a movable sensor of a camera is positioned when the camera captures a first image; selecting, by the at least one processor and from at least one database including a plurality of intrinsic calibration data sets indexed by a respective plurality of second camera sensor positions, one of the plurality of second camera sensor positions based on the first camera sensor position of the movable sensor; retrieving, from the at least one database and for the camera, a first intrinsic calibration data set, of the plurality of intrinsic calibration data sets, that is indexed by the selected one of the plurality of second camera sensor positions; and rectifying, by the at least one processor, the first image using the first intrinsic calibration data set of the camera retrieved from the at least one database.

Clause 14: The system of clause 13, wherein the operations further comprise: classifying, by the at least one processor, at least one object represented in the rectified first image.

Clause 15: The system of clause 13 or 14, wherein the camera is configured on a vehicle.

Clause 16: The system of clause 15, wherein the operations further comprise providing, by the at least one processor, the rectified image to a perception system of the vehicle to classify at least one object represented in the rectified first image.

Clause 17: The system of any of clauses 13-16, wherein the selecting the one of the plurality of second camera sensor positions based on the first camera sensor position includes selecting the one of the plurality of second camera sensor positions that is closest to the first camera sensor position.

Clause 18: The system of any of clauses 13-17, wherein intrinsic parameters in the plurality of intrinsic calibration data sets are generated by a diffractive optical element (DOE) geometrical camera calibration technique.

Clause 19: The system of any of clauses 13-18, wherein intrinsic parameters in the plurality of intrinsic calibration data sets are generated by a Zhang camera calibration method.

Clause 20: At least one non-transitory storage media storing instructions that, when executed by at least one processor, cause the at least one processor to perform operations comprising: obtaining, by the at least one processor, a first camera sensor position at which a movable sensor of a camera is positioned when the camera captures a first image; selecting, by the at least one processor and from at least one database including a plurality of intrinsic calibration data sets indexed by a respective plurality of second camera sensor positions, one of the plurality of second camera sensor positions based on the first camera sensor position of the movable sensor; retrieving, from the at least one database and for the camera, a first intrinsic calibration data set, of the plurality of intrinsic calibration data sets, that is indexed by the selected one of the plurality of second camera sensor positions; and rectifying, by the at least one processor, the first image using the first intrinsic calibration data set of the camera retrieved from the at least one database.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    obtaining, by at least one processor, a first camera sensor position at which a movable sensor of a camera is positioned when the camera captures a first image;
    selecting, by the at least one processor and from at least one database comprising a plurality of intrinsic calibration data sets indexed by a respective plurality of second camera sensor positions, one of a plurality of second camera sensor positions based on the first camera sensor position of the movable sensor, wherein respective intrinsic parameters of an intrinsic calibration data set comprise a focal length, an optical center, and distortion parameters;
    retrieving, from the at least one database and for the camera, a first intrinsic calibration data set comprising intrinsic parameters, of the plurality of intrinsic calibration data sets, that is indexed by the selected one of the plurality of second camera sensor positions;
    rectifying, by the at least one processor, the first image using the first intrinsic calibration data set comprising the intrinsic parameters of the camera retrieved from the at least one database;
    obtaining, by the at least one processor, a second camera sensor position at which the movable sensor of the camera is positioned when the camera captures a second image;
    determining, by the at least one processor, that a distance between the second camera sensor position and the first camera sensor position satisfies a threshold;
    selecting, by the at least one processor and from the at least one database, another one of the plurality of second camera sensor positions that is closest to the second camera sensor position in response to the determining;
    retrieving, from the at least one database and for the camera, a second intrinsic calibration data set, of the plurality of intrinsic calibration data sets, that is indexed by the selected another one of the plurality of second camera sensor positions; and
    rectifying, by the at least one processor, the second image using the second intrinsic calibration data set of the camera retrieved from the at least one database.

2. The method of claim 1, further comprising:
    classifying, by the at least one processor, at least one object represented in the first image that is rectified.

3. The method of claim 1, wherein the camera is configured on a vehicle.

4. The method of claim 3, further comprising:
    providing, by the at least one processor, the first image that is rectified to a perception system of the vehicle to classify at least one object represented in the first image that is rectified.

5. The method of claim 1, wherein the camera includes an in-body image stabilization system capable of causing the movable sensor to move within the camera.

6. The method of claim 5, wherein:
    the camera is configured on a vehicle; and
    the in-body image stabilization system causes the movable sensor to move in response to a movement of the vehicle.

7. The method of claim 1, wherein the selecting the one of the plurality of second camera sensor positions based on the first camera sensor position includes selecting the one of the plurality of second camera sensor positions that is closest to the first camera sensor position.

8. The method of claim 1, wherein the respective intrinsic parameters in the plurality of intrinsic calibration data sets are generated by a diffractive optical element (DOE) geometrical camera calibration technique.

9. The method of claim 1, wherein the respective intrinsic parameters in the plurality of intrinsic calibration data sets are generated by a Zhang camera calibration method.

10. The method of claim 1, further comprising:
    rectifying, by the at least one processor and in response to the determining, the second image using the first intrinsic calibration data set of the camera without retrieving any other intrinsic calibration data set from the at least one database.

11. A system, comprising:
at least one processor, and
at least one non-transitory storage media storing instructions that, when executed by the at least one processor, cause the at least one processor to perform operations comprising:
   obtaining, by the at least one processor, a first camera sensor position at which a movable sensor of a camera is positioned when the camera captures a first image;
   selecting, by the at least one processor and from at least one database comprising a plurality of intrinsic calibration data sets indexed by a respective plurality of second camera sensor positions, one of a plurality of second camera sensor positions based on the first camera sensor position of the movable sensor, wherein respective intrinsic parameters of an intrinsic calibration data set comprise a focal length, an optical center, and distortion parameters;
   retrieving, from the at least one database and for the camera, a first intrinsic calibration data set comprising intrinsic parameters, of the plurality of intrinsic calibration data sets, that is indexed by the selected one of the plurality of second camera sensor positions;
   rectifying, by the at least one processor, the first image using the first intrinsic calibration data set comprising the intrinsic parameters of the camera retrieved from the at least one database;
   obtaining, by the at least one processor, a second camera sensor position at which the movable sensor of the camera is positioned when the camera captures a second image;
   determining, by the at least one processor, that a distance between the second camera sensor position and the first camera sensor position satisfies a threshold;
   selecting, by the at least one processor and from the at least one database, another one of the plurality of second camera sensor positions that is closest to the second camera sensor position in response to the determining;
   retrieving, from the at least one database and for the camera, a second intrinsic calibration data set, of the plurality of intrinsic calibration data sets, that is indexed by the selected another one of the plurality of second camera sensor positions; and
   rectifying, by the at least one processor, the second image using the second intrinsic calibration data set of the camera retrieved from the at least one database.

12. The system of claim 11, wherein the operations further comprise:
classifying, by the at least one processor, at least one object represented in the first image that is rectified.

13. The system of claim 11, wherein the camera is configured on a vehicle.

14. The system of claim 13, wherein the operations further comprise providing, by the at least one processor, the first image that is rectified to a perception system of the vehicle to classify at least one object represented in the first image that is rectified.

15. The system of claim 11, wherein the selecting the one of the plurality of second camera sensor positions based on the first camera sensor position includes selecting the one of the plurality of second camera sensor positions that is closest to the first camera sensor position.

16. The system of claim 11, wherein the respective intrinsic parameters in the plurality of intrinsic calibration data sets are generated by a diffractive optical element (DOE) geometrical camera calibration technique.

17. The system of claim 11, wherein the respective intrinsic parameters in the plurality of intrinsic calibration data sets are generated by a Zhang camera calibration method.

18. At least one non-transitory storage media storing instructions that, when executed by at least one processor, cause the at least one processor to perform operations comprising:
   obtaining, by the at least one processor, a first camera sensor position at which a movable sensor of a camera is positioned when the camera captures a first image;
   selecting, by the at least one processor and from at least one database comprising a plurality of intrinsic calibration data sets indexed by a respective plurality of second camera sensor positions, one of a plurality of second camera sensor positions based on the first camera sensor position of the movable sensor, wherein respective intrinsic parameters of an intrinsic calibration data set comprise a focal length, an optical center, and distortion parameters;
   retrieving, from the at least one database and for the camera, a first intrinsic calibration data set comprising intrinsic parameters, of the plurality of intrinsic calibration data sets, that is indexed by the selected one of the plurality of second camera sensor positions;
   rectifying, by the at least one processor, the first image using the first intrinsic calibration data set comprising the intrinsic parameters of the camera retrieved from the at least one database;
   obtaining, by the at least one processor, a second camera sensor position at which the movable sensor of the camera is positioned when the camera captures a second image;
   determining, by the at least one processor, that a distance between the second camera sensor position and the first camera sensor position satisfies a threshold;
   selecting, by the at least one processor and from the at least one database, another one of the plurality of second camera sensor positions that is closest to the second camera sensor position in response to the determining;
   retrieving, from the at least one database and for the camera, a second intrinsic calibration data set, of the plurality of intrinsic calibration data sets, that is indexed by the selected another one of the plurality of second camera sensor positions; and
   rectifying, by the at least one processor, the second image using the second intrinsic calibration data set of the camera retrieved from the at least one database.

* * * * *